US006980988B1

(12) United States Patent
Demers et al.

(10) Patent No.: US 6,980,988 B1
(45) Date of Patent: Dec. 27, 2005

(54) METHOD OF APPLYING CHANGES TO A STANDBY DATABASE SYSTEM

(75) Inventors: Alan J. Demers, Boulder Creek, CA (US); James William Stamos, Saratoga, CA (US); Lewis S. Kaplan, Los Angeles, CA (US); Nimar Arora, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 432 days.

(21) Appl. No.: 10/260,547

(22) Filed: Oct. 1, 2002

Related U.S. Application Data

(60) Provisional application No. 60/325,563, filed on Oct. 1, 2001.

(51) Int. Cl.[7] ............................................. G06F 17/30
(52) U.S. Cl. .......................................................... 707/8
(58) Field of Search .................. 707/1–10, 100–104.1, 707/200–205

(56) References Cited

U.S. PATENT DOCUMENTS

| | | | | |
|---|---|---|---|---|
| 5,170,480 A | * | 12/1992 | Mohan et al. ............... | 707/201 |
| 5,530,855 A | * | 6/1996 | Satoh et al. ................. | 707/201 |
| 6,205,449 B1 | * | 3/2001 | Rastogi et al. .............. | 707/202 |
| 6,289,357 B1 | * | 9/2001 | Parker ......................... | 707/202 |
| 2002/0103816 A1 | * | 8/2002 | Ganesh et al. .............. | 707/204 |

OTHER PUBLICATIONS

Copending U.S. Appl. No. 09/156,557 (1997-011-05), filed Sep. 17, 1998.
Copending U.S. Appl. No. 09/748,408 (1997-011-05 CON), filed Dec. 22, 2000.
Copending U.S. Appl. No. 09/156,548 (1997-011-02), filed Sep. 17, 1998.

* cited by examiner

*Primary Examiner*—Diane Mizrahi
(74) *Attorney, Agent, or Firm*—Hickman Palermo Truong & Becker LLP

(57) ABSTRACT

A method for applying changes to a standby system is described in which multiple apply tasks or "slaves" are scheduled to changes from redo logs, especially those changes in large transactions, in parallel and as soon as they are encountered in the logs. To foster data convergence, a partial ordering may be imposed on the transactions so that those transactions that actually depend on others are forced to wait on the transactions they are dependent upon commit. To foster read consistency, synchronization points may be periodically established, at which points a read consistent state of the standby database system can be obtained-all without adversely impact the throughput of the system.

13 Claims, 7 Drawing Sheets

METHOD OF APPLYING CHANGES TO A STANDBY DATABASE SYSTEM

RELATED APPLICATIONS

The present application claims the benefit of U.S. Provisional Patent Application Ser. No. 60/325,563 filed on Oct. 1, 2001, the contents of which are hereby incorporated by reference.

FIELD OF THE INVENTION

The present invention relates to high availability database systems and more particularly to method of applying changes to a standby database system.

BACKGROUND OF THE INVENTION

Enterprises use computer databases to store, organize, and analyze some of their most important information. For example, a business may employ a database to warehouse its sales and ordering information so that analysts can predict trends in product sales or perform other kinds of data mining for long-range planning. Because database systems are responsible for managing information vital to the organization's operation, it is crucial for mission-critical database systems to implement mechanisms for recovery following a database system failure.

Recovery from all but the most serious kinds of failures generally relies on periodic backups, which are done to save the state of the database to a longer term storage medium, such as magnetic tape or optical disk. Because users continue to modify the database since the time of the last backup, the users' committed transactions are recorded in one or more "redo logs" on disk. Thus, to recover from a system crash, the periodic backup is used to restore the database system, and the committed transactions in the redo logs are reapplied to bring the database up to date to the state at the time of the system crash.

Some failures are more serious, however. For example, a hard disk that stores the contents of a database can be unreadable after a head crash. Earthquakes, fires, floods, tornadoes, and other acts of God can physically destroy the disk upon which the redo logs are saved. In these cases, the modifications and updates to the database after the last backup are permanently lost. Thus, for mission-critical database systems, a more robust approach for disaster recovery is needed. Moreover, restoration of a database from backups and redo logs is a time consuming process, and some enterprises cannot afford the necessary downtime. For example, one study has estimated that the average impact of one hour of downtime can run as high as $6.5 million in the retail brokerage industry.

Accordingly, there has been much interest in implementing disaster recovery by deploying a "standby" database system that is a replica of the business's primary database system. The standby database is typically created from a backup of the primary database, and the primary database and the standby database coordinate with each other such that the standby database keeps up with changes made on the primary database in the standby's own logs. In the event of an irrecoverable crash or other disaster, the standby database can quickly be activated ("failover") to become the business's new primary database by applying all the remaining unapplied transactions without having to wait for restoring the primary database from the last backup and redo logs. Even though the downtime for failover of a standby database is much less than that of restoration from backups, there is still an urgent need for reducing the amount of unplanned downtime.

SUMMARY OF THE INVENTION

The present invention stems from the recognition that one source of delay in activating a standby database comes from applying large transactions in the redo logs. Large transactions greatly complicate the ability to apply and commit transactions in the same order on the standby database as on the primary database. For example, the large transaction may be present in wide disperse portions of the redo log over even bridge from one redo log to another, thereby typing up much code and memory resources to keep tack of all the changes in the large transaction until it is ready to be committed.

The slow failover problem is addressed in some embodiments by providing a plurality of apply tasks or "slaves" that can apply changes, especially those in large transactions, in parallel and as soon as they are encountered in the logs. As a result, it is possible to for the apply tasks to commit transactions in a different order on the standby database system than on the primary database system. To foster data convergence, a partial ordering may be imposed on the transactions so that those transactions that actually depend on others are forced to wait on the transactions they are dependent upon commit. To foster read consistency, synchronization points may be periodically established, at which points a read consistent state of the standby database system can be obtained-all without adversely impact the throughput of the system.

Accordingly, one aspect of the present invention pertains to a method and software for applying changes made at a primary database system to a standby database system. A change record is obtained from a log containing at least some of the changes. The change record belongs to a first transaction that was committed at a first commit time in the primary database system. The change record is associated with a second transaction that was committed at a second commit time in the primary database system that is earlier than the first commit time, and a task is scheduled to apply the change record at the standby database system, said task configured to commit the first transaction in the standby database system after the second transaction has been committed in the standby database system.

Another aspect of the invention relates to a method and software for applying changes made at a primary database system to a standby database system, in which change records are extracted from a log containing at least some of the changes, and at least some of the change records are associated with respective transactions that were committed at earlier commit times in the primary database system than when the changes records were committed in the primary database system. Multiple tasks are then scheduled to apply the change records at the standby database system, in which the tasks are configured to wait for committing the change records in the standby database system until after the associated transactions have been committed in the standby system, so that at least two transactions have been committed in the standby database system in a different order than the order in which the at least two transactions have been committed in the primary database system.

Still another aspect of the present invention involve a method and software for applying changes made at a primary database system to a standby database system, in which a synchronization point is established based on an upper bound of commit times in the primary database system of transactions that have been committed in the standby database system. Change records are extracted from a log containing at least some of the changes, and multiple tasks are scheduled to apply the change records at the standby database system. These tasks are configured to delay committing the change records in the standby database system if commit times in the primary database system of the corresponding change records are greater than the synchronization point. When a lower bound of commit times in the primary database system of transactions that have been committed in the standby database system reaches the synchronization point, the tasks are caused to resume committing the change records in the standby database system.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for maintaining a standby database system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Logical Standby Architecture and Overview

Figure 1:
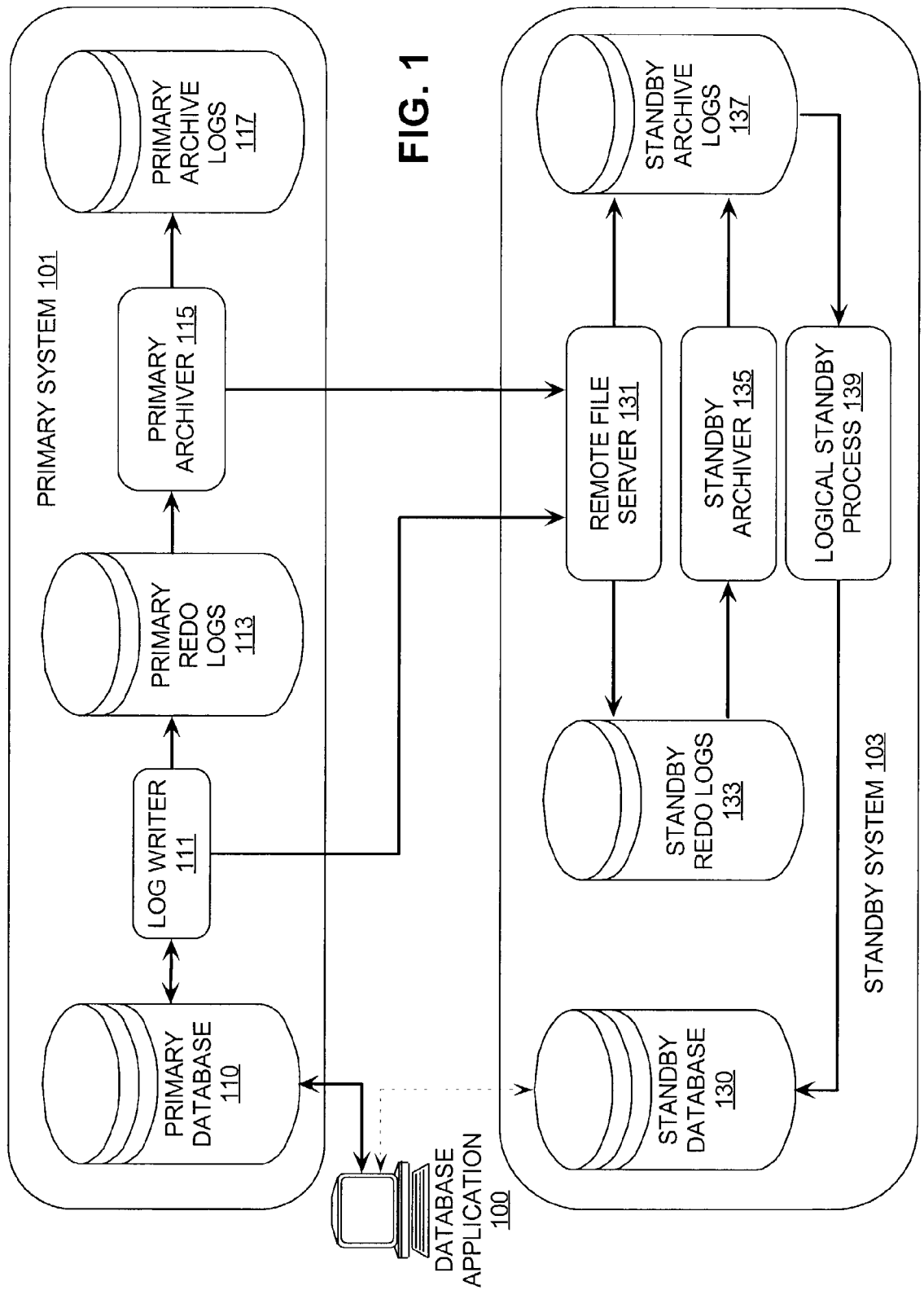
FIG. 1 illustrates a logical standby architecture that can be used in conjunction with an embodiment of the present invention.

FIG. 1 illustrates a logical standby architecture that can be used in conjunction with embodiments of the present invention. In this architecture, a database application 100 is in primary communication with a primary system 101 but can also be in communication, when necessary, with a standby system 103, which can be situated in different geographical locales, e.g. San Francisco and Boston, respectively. During normal operation, the database application 100 submits statements to a primary database 110 of the primary system 100. These statements cause the primary database 110 to store or retrieve data in response. When a change is committed to the primary database 110, the primary database 110 creates a redo record that describes the change and invokes a log writer process 111 to save the redo record to disk in one of a number of primary redo logs 113. When the standby system 103 is set up for synchronous transaction shipping, the log writer process 111 also transmits the redo records and transaction commits, via a remote filed server 131, to standby redo logs 133 for the standby database 130.

Meanwhile, in the background, an archiver process 115 inspects the primary redo logs 113 and saves the redo records in primary archive logs 117, for use among other reasons in non-disaster crash recovery. Specifically, changes stored in the primary redo logs 115 and the primary archive logs 117 can be applied to a system backup of the primary database 110 to bring the database up-to-date as it existed at the time of the system crash. When the standby system 103 is set up for synchronous transaction shipping, the archiver process 115 also transmits the redo records to the standby system 103. Specifically, the remote file server 131 receives the transmitted redo records and updates the standby archive logs 133.

A logical standby process 139 periodically inspects the standby archive logs 137, and applies the changes captured in the standby archive logs 137 to a standby database 130 by formulating the changes as Structure Query Language (SQL) statements and submitting the SQL statements to the standby database 130. In some deployments, it may be preferably to delay the application of the changes to the standby database 130 (as by 30 minutes, for example) to allow for human errors at the primary system 101 to be detected and corrected first. When the changes are applied, the standby database 130 is ready to be used by the database application 100 in case of a failure in the primary database system 110. In some situations, people find it convenient to deploy the standby database 130 in read-only mode as an independent reporting database.

Logical Standby Process Overview

Figure 2:
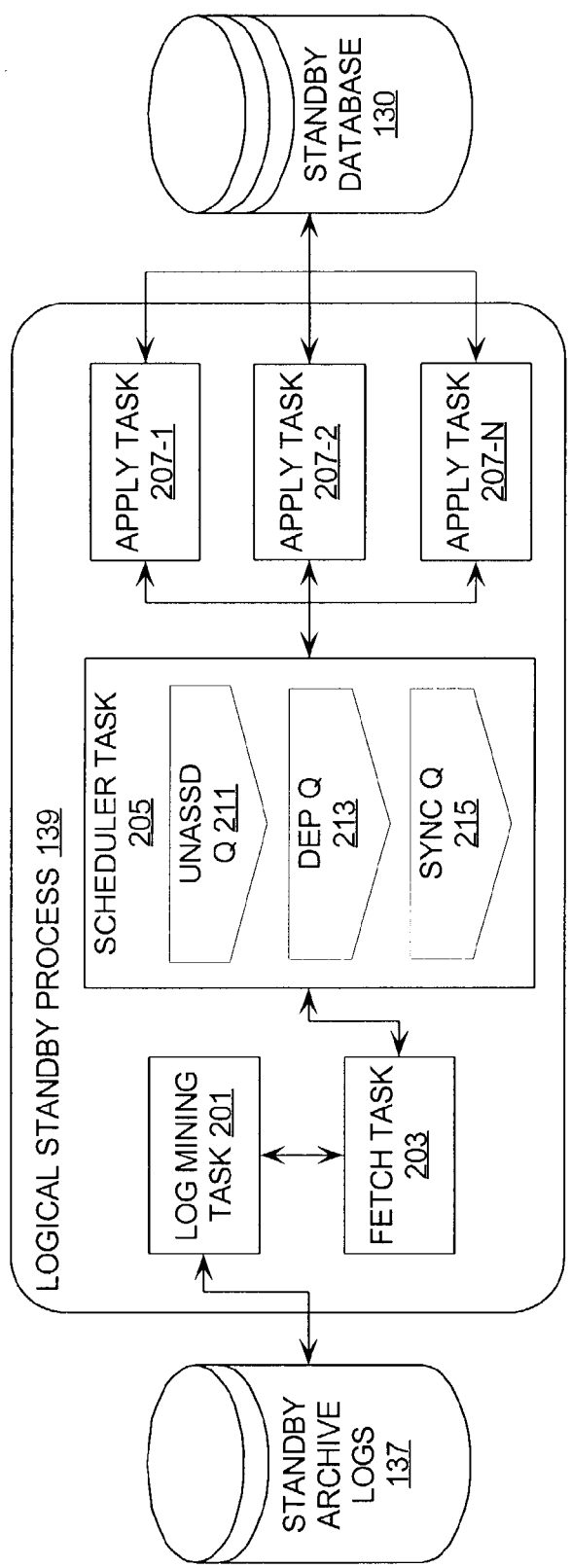
FIG. 2 is a block diagram depicting one implementation of a logical standby process in accordance with an embodiment of the present invention.

FIG. 2 is a block diagram depicting one implementation of a logical standby process 139 in accordance with an embodiment of the present invention, comprising a log mining task 201, a fetch task 203, a scheduler task 205, and a plurality of apply tasks 207-1, 207-2, . . . , 207-N. As used herein, a "task" is a sequence of instructions treated as a basic unit of work that can operate in parallel (e.g. concurrently or simultaneously) with other tasks. Tasks can be implemented by any of a variety of mechanisms, including operating system processes, threads, objects having a separate thread of control, etc., and the present invention is not limited to any particular mechanism or combination of mechanisms.

As explained in more detail below, the log mining task 201 is responsible for inspecting the standby archive logs 137, extracting the change data, and producing logical change records corresponding to the change data in the standby logs 137. The logical changes records including the change made, the transaction in which the change occurred, and the logical system time when the change occurred. These logical change records are processed by the fetch task 203, which calculates and annotates the data dependencies between the logical change records to help ensure data convergence, and delivers the annotated logical change records to a scheduler task 205. The scheduler task 205 is responsible for distributing the logical change records to one of a plurality of apply tasks 207-1, 207-2, . . . , 207- N making sure that the data dependencies are properly satisfied, so that, when the apply tasks 207-1, 207-2, . . . , 207-N apply the changes indicated in the logical change records to the standby database 130, the state of the standby database 130 converges to the state of the physical database 110. For this end, the scheduler task 205 may employ a number queues, including an unassigned job queue 211, a dependency queue 213, and a synchronization queue 215, as explained in more detail below. Moreover, to facilitate read consistency in a standby database 130 operating in read-only mode for reporting, synchronization points are established so that reporting application can obtain snapshots of the standby database 130 that is read consistent with a state of the physical database 110.

Logical Change Records

The log mining task 201 provides a layer of abstraction over the physical format of the standby archive logs 137, which is database vendor-specific. Specifically the log mining task 201 is configured to inspect the standby archive logs 137, extract the change data, and produce logical change records corresponding to the change data in the standby logs 137 Accordingly, much of the work in porting the logical standby process 139 to work with another vendor's standby archive logs 137 or another version of the same vendor's standby archive logs 137 would involve the log mining task 201, with minimal changes to the other components of the logical standby process 139.

Figure 3:
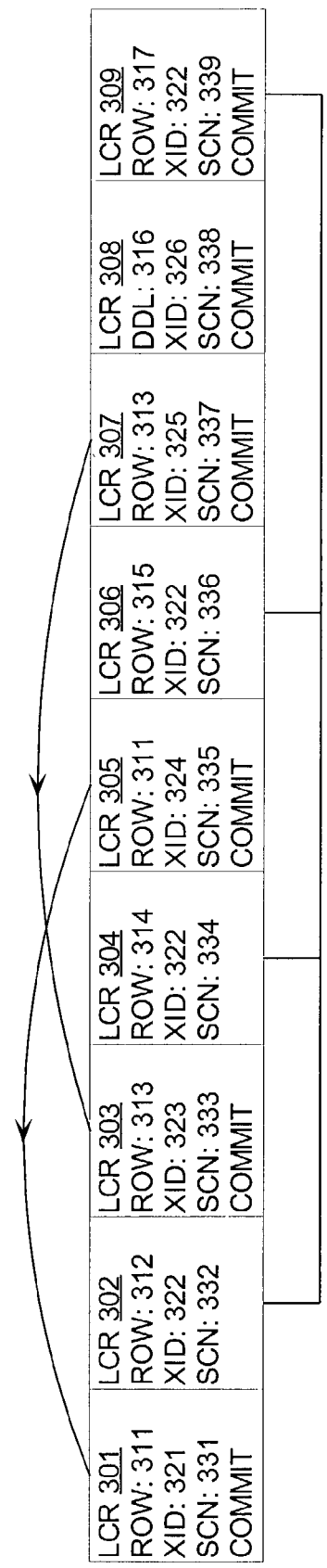
FIG. 3 shows a sequence of logical change records in accordance with a working example used to illustrate the operation of an embodiment of the present invention.

FIG. 3 illustrates the kind of information in a sequence of logical change records 301–309 produced by the log mining task 201 in accordance with a working example used to illustrate the operation of an embodiment of the present invention. Specifically, each logical change record 301–309 includes some change data (ROW or DDL), a transaction identifier (XID), and a system change number (SCN). Furthermore, each logical change record may include information, as by a flag, that specifies whether the transaction that the change belongs to is to be committed.

The change data may describe a Data Manipulation Language (DML) change to a single row of data, which includes the identity of the changed table, old and new values for all changed columns, and values for key columns, which identify the row (ROW) to be changed. Referring to FIG. 3, logical change records 301, 302, 303, 304, 305, 306, 307 and 309 involve DML changes to rows 311, 312, 313, 314, 311, 315, 313, and 317, respectively. Note that in this example, both logical change records 301 and 305 involve a change to the same row 311, and both logical change records 303 and 307 involve a change to row 313. The change data may also describe a Data Definition Language (DDL) change, which involves a change to a structure or instance of a database object, such as adding or dropping a table, adding or dropping columns of a table, etc. In the working example, logical change record 308 involves a DDL change 316.

The transaction identifier XID identifies the transaction the change data belongs to and can be implemented as a monotonically increasing number that uniquely each transaction on the primary database 110 that gave rise to the change data. A transaction can be complete or incomplete. An incomplete transaction is a transaction whose change records are applied before the commit record is seen by the log mining task 201. In the example, transaction 322 is an incomplete transaction since logical change records 302, 304, and 306 that belong to the transaction are seen by the log mining task 201 before the logical change record 308, which has the commit. Although FIG. 3 for ease of illustration shows only separate, single logical change records for each transaction, a plurality of logical change records can be grouped together for a transaction as a "chunk." Complete transactions are delivered in one chunk while incomplete (or "eager") transactions are delivered in multiple chunks.

The system change number (SCN) represents a logical system time that an event occurred in the database system and can be implemented as a monotonically increasing serial number, such that each new DML or DDL statement is assigned a new system change number that is greater than any system change number that has been assigned beforehand. Accordingly, each transaction has a unique system change number for each modification made to a table in the relational database management system, and a transaction may comprise a plurality of modifications each having a corresponding system change number. Moreover, when the transaction commits there is a final system change number, referred to here as the "commit system change number" (CSCN) that applies to the transaction as a whole. In a relational database management system, changes to the contents of the database are actually applied at commit time; thus, the CSCN stands for time in which all the operations of the transaction are actually applied in the database. In the working example illustrated in FIG. 3, logical change records 301, 303, 305, 307, 308, and 309 specifies a commit, so the respective system change numbers 331, 333, 335, 337, 338, and 339 indicate commit system change numbers. On the other hand, logical change records 302, 304, and 306 do not specify a commit, so the respective system change numbers 332, 334, and 336 are not commit system change numbers.

Dependencies

The fetch task 203 is responsible for calculating and annotating the data dependencies between the logical change records obtained from the log mining task 201. The dependency associated with a logical change record is used to constrain the timing of when the logical change record can be applied to the standby database 130. Specifically, a logical change record can be safely applied only after its associated dependency had been satisfied. In one embodiment, a dependency includes zero or more transactional dependencies and a single watermark dependency, both types of which are identified by a transaction identifier, system change number pair <XID,SCN>. A transactional dependency is satisfied when the transaction identified in the <XID,SCN> pair has already been committed in the standby database 130. A watermark dependency is satisfied when every transaction with a commit system change number CSCN less than or equal to the SCN component of the watermark dependency has been applied.

Figure 4:
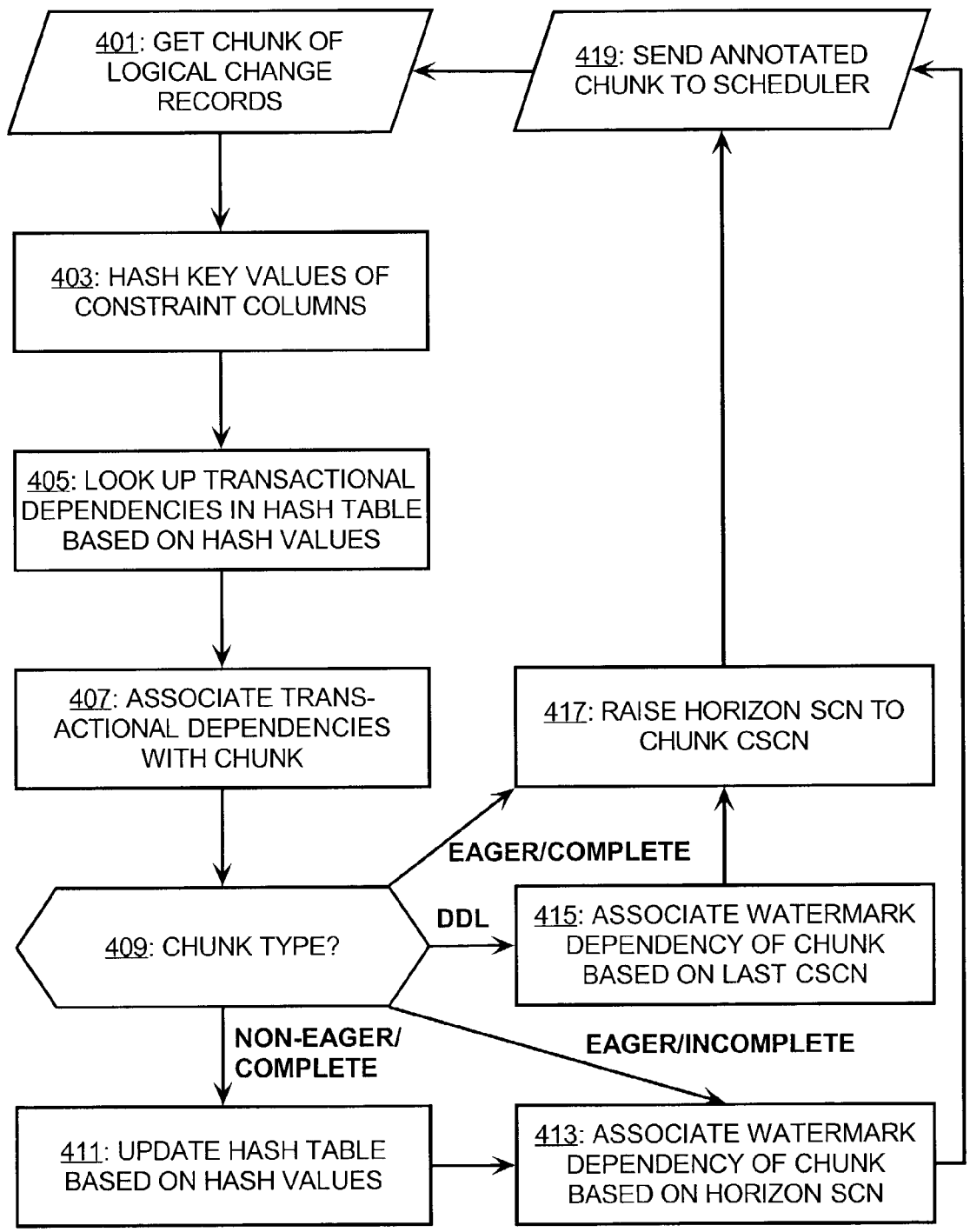
FIG. 4 is a flowchart showing the operation of a fetch task in accordance with an embodiment of the present invention.

FIG. 4 is a flow chart showing steps performed by the fetch task 203 in computing the dependency of logical change records, in which a hash table of transactional dependencies of commit system change number, transaction identifier <CSCN,XID> entries. At step 401, a chunk of logical change records for a transaction is delivered from the log mining task 201, and key values of constraint columns are hashed (step 403). Alternatively, step 403 can be done via a callback registered with the log mining task 201 so that the hash key values are delivered to the fetch task 203. The transaction dependencies are looked up in the hash table based on the hash values (step 405) and associated with the logical change records (step 407), e.g. by including the dependency entries in space reserved for that purpose in logical change records. Constraint columns refer to the columns of the table (modified by the change record) correspond to constraints as in unique key constraints and foreign key constraints. Each table has at least one some constraint called the identification key.

If the transaction of the chuck is simple, e.g. a complete transaction and not a DDL change (tested at step 409), then the hash table is updated in step 411 to write the commit system change number, transaction identifier <CSCN,XID> entries for the current transaction in the appropriate positions in the hash table (indexed the hash values of the constraint columns of this chunk). After updating the hash table in step 411, the watermark dependency is associated based on a horizon system change number that is being maintained by fetch task 203.

Data definition language (DDL) changes and eager (incomplete) transactions are handled somewhat differently for different reasons. DDL changes have transactional dependencies that are difficult to specify. Therefore, a watermark dependency is used to coordinate the data dependencies. Specifically, the DDL transactions is given a watermark dependency on the commit system change number CSCN of last committed transaction (step 415). When the DDL commits, all subsequent logical change records are given a watermark dependency on the commit system change number of the transaction, by raising the horizon system change number to the transaction's commit system change number (step 417). Consequently, future transactions will acquire a watermark dependency at least as recent as the horizon system change number via step 413.

While transactional dependencies are easy to calculate for incomplete (eager) transactions, eager transactions would typically require the updating of a large number of entries in the hash table, which adversely impacts performance. Therefore, the dependencies of the logical change records are calculated as usual (steps 403, 405, and 407), but the updating of the hash table at step 411 is skipped. In fact, the system change number in the chunks of the incomplete transaction are not commit system change numbers, so the hash table cannot be updated with the information. Instead, execution directly goes to step 413 where the eager transaction chunk acquires the appropriate watermark dependency. When the eager transaction commits, it is desirable to avoid the cost of updating a large number of hash entries, so step 417 are executed, in which the horizon system change number is raised to the transaction's commit system change number.

When all the transactional dependencies, if any, and the watermark dependency have been associated with the chunk, the chunk is sent along with the dependencies to the scheduler task 205.

Example of Dependency Computation

The operation of the dependency computation is now explained with respect to the working example of a sequence of logical change records 301–309. Prior to the fetching logical change record 301, it is assumed for purposes of explanation the hash table is cleared of entries and horizon system change number is an antediluvian 330 with an antediluvian transaction identifier of 320.

For logical change record 301, there are no (relevant) entries in the hash table, so steps 403, 405, and 407 result in no transactional dependency being associated for logical change record 301. Logical change record 301 has a commit and is therefore complete (step 409), so execution branches to step 411, where a commit system change number, transaction identifier entry of <331,321> is stored in the hash table in a position corresponding to row 311. Its dependency list therefore contains only the watermark dependency of <320,330> from step 413.

Logical change record 302 is the first chunk of an incomplete or eager transaction 322. It too has no transactional dependency associated for logical change record 301. Since the eager transaction 322 has not yet committed, step 411 is skipped and the logical change record 302 acquires the watermark dependency of <320,330> as its only dependency.

For logical change record 303, there are no entries in the hash table corresponding to row 313, so steps 403, 405, and 407 result in no transactional dependency being associated for logical change record 303. Logical change record 303 is complete (step 409), so, at step 411, a commit system change number, transaction identifier entry of <333,323> is stored in the hash table in a position corresponding to row 313. After performing step 413, its dependency list contains only the watermark dependency of <320,330>.

Logical change record 304 is the second chunk of eager transaction 322, with no transactional dependency on row 314 being made associated for logical change record 304. This eager transaction 322 has not yet committed, so step 411 is skipped and the logical change record 304 acquires the watermark dependency of <320,330> as its only dependency via step 413.

Logical change record 305 is the first one in this example to have a transactional dependency, because there is an entry in the hash table corresponding to row 311, namely <331, 321> from transaction 321. The hash table in the position corresponding to row 311 is then updated (step 411) with a commit system change number, transaction identifier entry of <335,324>. After performing step 413, its dependency list contains the transaction dependency of <321,331> and the watermark dependency of <320,330>.

Like logical change record 304, logical change record 306 is another chunk of eager transaction 322, with no transactional dependency (on row 315) associated for logical change record 301. Since eager transaction 322 has not yet committed, the logical change record 304 acquires the antediluvian watermark dependency of <320,330> as its only dependency (step 413).

Logical change record 307 is another transaction to have a transactional dependency, because there is an entry in the hash table corresponding to row 313, namely <333,323> from transaction 323. The hash table in the position corresponding to row 313 is then updated (step 411) with a commit system change number, transaction identifier entry of <337,325>. After performing step 413, its dependency list contains the transaction dependency of <323,333> and the watermark dependency of <320,330>.

Logical change record 308 encompasses a DDL change 316 in transaction 326 and has no entry in the hash table corresponding to row 316. Accordingly, logical change record 308 acquires the watermark dependency on the last committed transaction, i.e. transaction 325 with a commit system change number 337. Its only dependency therefore is the watermark dependency of <325,337>. At step 417, the horizon system change number is raised to 338, the commit system change number of transaction 326.

Finally, logical change record 309 is the last chunk of eager transaction 322, having no transactional dependency (on row 317) associated for logical change record 309. Since incomplete transaction 322 has finally committed, the horizon system change number is raised to 339, the commit system change number of transaction 322 (step 417).

Accordingly, the dependencies calculated in this example enable a partial ordering to imposed on committing the transactions in the standby database 130. As long as transaction 321 of logical change record 301 is committed before transaction 324 of logical change record 305, as long as transaction 323 is committed before transaction 325, as long as transactions 321, 323, 324, and 325 are committed before transaction 326 commits, and as long as transactions 321, 323, 324, 325, and 326 are committed before transaction 327 commits data convergence will occur.

Read Consistency

The above definition of dependency allows transactions to be committed at the standby database 130 in a different order from the one in which the transaction were committed at the primary database 110. Any commit order that respects all the dependencies will guarantee data convergence, but need not guarantee read consistency, which is the absence of inconsistent, user-readable intermediate states at the standby database 130. In general, only committing transaction in the original commit system change number CSCN order of the primary database 110 can guarantee read consistency. Although the scheduler task 205 can enforce the original CSCN ordering of commits at all time, this enforcement causes a loss of throughput. Because this loss can be significant, one aspect of the present invention related to the use of synchronization points to provide a level of read consistency.

A synchronization point is a system change number at the standby database 110 at which is guaranteed that the standby database 110 is in a consistent state. Maintaining periodic synchronization points is a technique to get read consistency for a read-only (report) database together with most of the performance benefits of an out-of-order commit.

Ordinarily, when a reading application does a query, the application uses the current system change number for its read time. Because the logical standby process 139 permits out-of-order comments, in the absence of synchronization points, the reader would potentially see an inconsistent state. Therefore, when the standby database is open as a read-only replicant, instead of using the current system change number, the reader uses the most recent synchronization point system change number instead.

Producing a synchronization point, in one embodiment of the present invention, uses the concepts of a low watermark and a high watermark. A low watermark is the strict lower bound of the commit system change number of any transaction that has not yet been applied at the standby database 110. Similarly, a high watermark is the inclusive upper bound of the commit system change number that has indeed been applied at the standby database 110. (Other implementations may use other combinations a of inclusive and strict bounds.)

Periodically, the scheduler task 205 enters a mode, in which the scheduler task 205 does not allow any of the apply tasks 207 to commit whose commit system change number exceeds the high watermark. Eventually, the low watermark will reach the high watermark, at which point, the scheduler task 205 gets the current system change number at the standby database 110 as the synchronization point. Between synchronization points, the scheduler task 205 allows commits to occur in any order consistent with data dependencies. This approach employs a permission-to-comment exchange of messages between the scheduler task 205 and the apply tasks 207, which does impose a cost, but this cost is more than offset by the savings in allowing eager transactions to be applied out-of-order.

Deadlock Avoidance

In order to achieve fast failover times, the scheduler task 205 must be able to assign a large transaction to an apply task 207 before the commit for the transaction has been encountered in the standby archive log 137. Unfortunately, if the assignment is done naively, the scheduler task and the apply tasks 207 can deadlock, as illustrated below.

Suppose there are K apply tasks 207, in which the first K transactions $T_1$ through $T_K$ encountered in the standby archive log 137 are large transactions. Suppose that the next transaction $T_{K+1}$ begins, updates a hot spot in the standby database 110, and then commits. Then, suppose each of transactions $T_1$ through $T_K$ successively updated the same hotspot and commits. A naïve scheduler task 205 would assign the first K transactions, in order, to the K apply tasks 207: $T_1$ to $a_1$, $T_2$ to $a_2$, ..., $T_K$ to $a_K$, reaching a configuration with no apply tasks 207 available for assignment. This system would then deadlock, because the scheduler task 205 would unable to assign transaction $T_{K+1}$ (with no available apply tasks 207) and none of transactions $T_1$ through $T_K$ could proceed (because all of them depend on transaction $T_{K+1}$).

The following is one class of assignments that is guaranteed not to deadlock, with the assumption that an apply task 207 given an independent job (which does not depend on other jobs) will eventually complete the job. A "safe job" includes an administrative job (e.g. recording low watermark values in persistent storage), a transaction with no dependencies, and a transaction with dependencies only on other safe transactions that have been assigned to apply tasks 207. Since the transactional dependencies are acyclic, it is easy to see that, even if the scheduler task 205 stops scheduling new jobs, all the safe jobs will eventually terminate.

A configuration is "K-safe" if at least K apply tasks 207 are working on safe jobs or are idle. These idle apply tasks 207 are called "reserved." Clearly, a K-safe configuration is not deadlocked when K is positive. In fact, the scheduler task 205 can schedule and complete at least K safe jobs (or all if less than K safe jobs).

Suppose a configuration is K-safe, and one of the jobs completes. Since the apply task 207 is now idle, the configuration remains K-safe. The scheduler task 205 only has to ensure that a reserved apply task 207 is assigned a safe job to maintain the K-safety invariant. If there is no safe job to schedule and the scheduler task 205 has only reserved idle apply tasks 207, then the scheduler task 205 keeps on fetching transactions until the scheduler task 205 finds a complete transaction (which is guaranteed to be safe). While fetching for a complete transaction, the scheduler task 205 can discard any unassigned complete transactions to free up memory. Note that it is not necessary to keep track of which apply tasks 207 are reserved but only how many of the idle apply tasks 207 are reserved.

It is important to ensure that all transactions fetched from the log mining task 201 get a fair chance of being applied. If the scheduler task 205 is busy scheduling administrative jobs, for instance, there will be no free apply task 207 to apply transactions. To prevent "starvation," therefore, most administrative jobs are invoke in response to some transaction getting applied. The scheduler task 205 must also prevent starvation of eager transactions by complete transactions. Clearly if N (the number apply tasks 207) is equal K, no eager transaction will ever be scheduled. Otherwise, the N-K apply tasks 207 will be assigned to the transactions without prejudice. It is not fully apparent, what an optimal value for K is, other than it must be greater than zero. Therefore, the value of K is preferably a tunable parameter that the system administrator can tweak; its default value is set to an arbitrary value like N/3 or 1, whichever is greater.

Scheduling

Figure 5A:
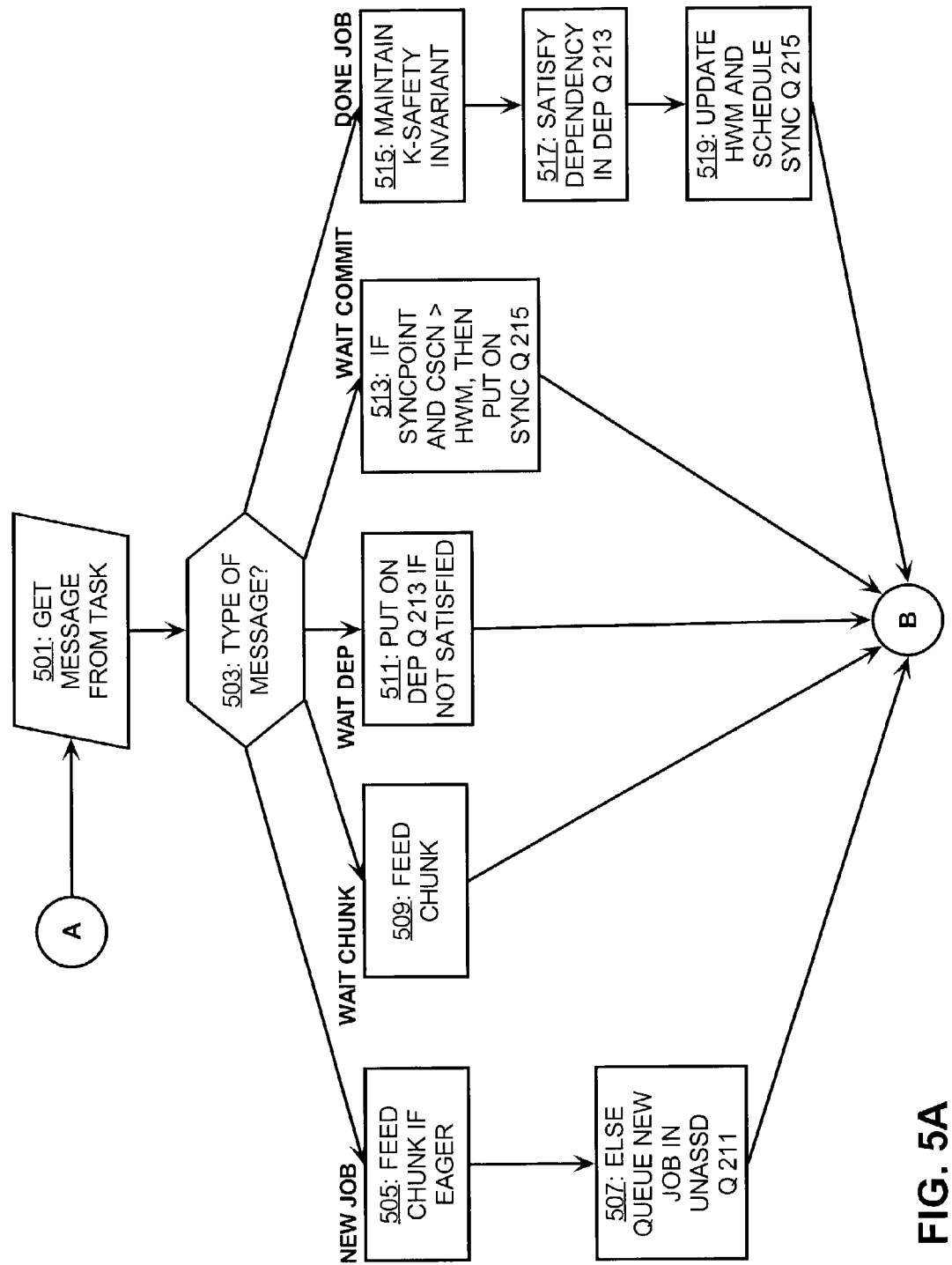
FIGS. 5A and 5B together constitute a flowchart showing the operation of a scheduler task in accordance with an embodiment of the present invention.
Figure 5B:
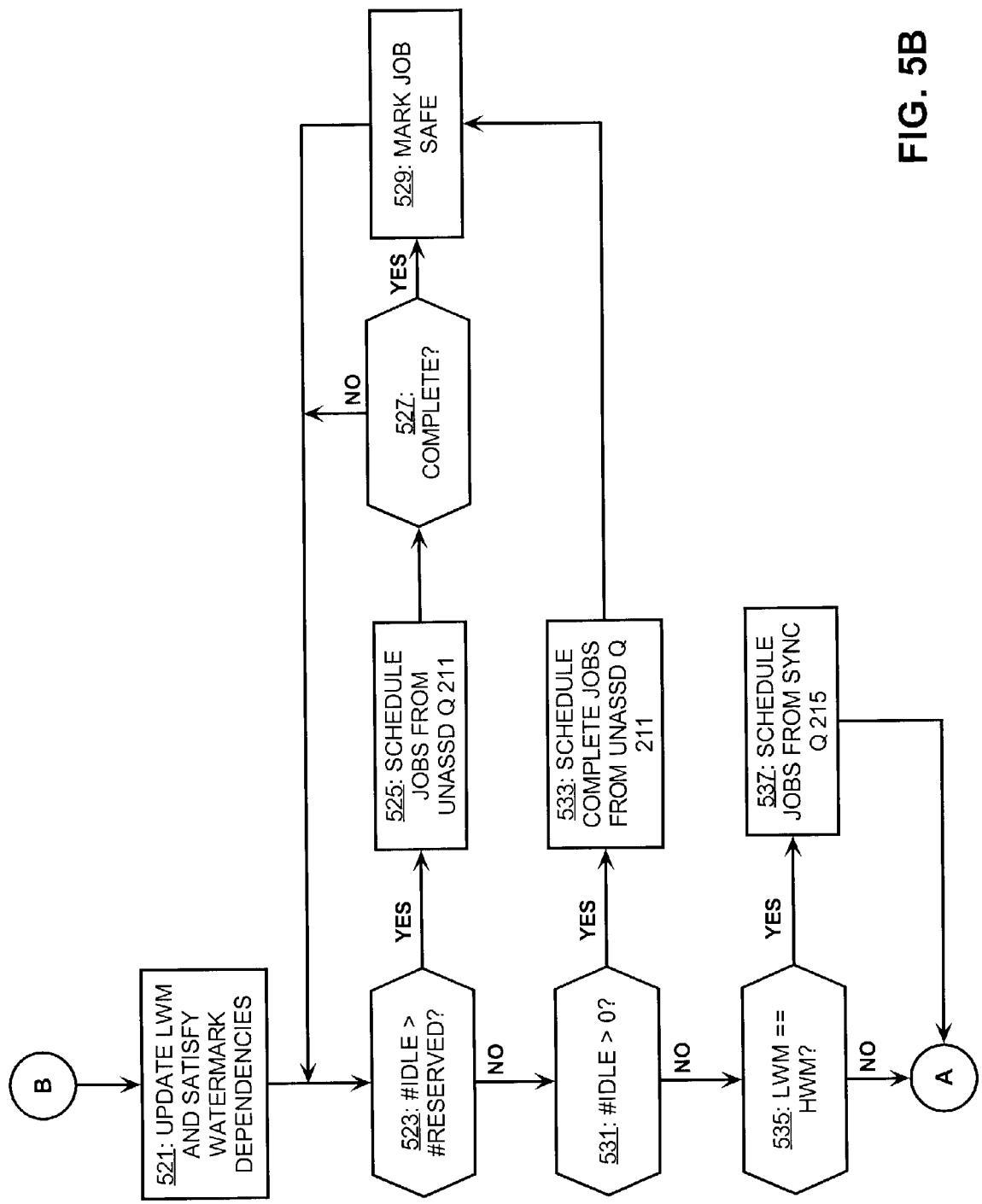

FIGS. 5A and 5B together constitute a flowchart showing the operation of the main loop in a scheduler task 205 in accordance with an embodiment of the present invention. The loop begins at step 501 in FIG. 5A, where the scheduler task 205 receives messages from the fetch task 203 and the apply tasks 207 via an inter-process communication (IPC) mechanism or other task-to-task communication facility. Depending on the type of the message (step 503), various actions may be taken, as follows:

For example, if the scheduler task 205 receives a NEW JOB message from fetch task 203, then the scheduler task 205 processes the new job based on whether it belongs to an eager transaction. If the job is a chunk of logical change records for an apply task 207 that is already assigned to work on the eager transaction, then the chunk is sent to the apply task 207 (step 505). Otherwise, the new job is put on the unassigned queue 211 for later assignment to a task (step 507).

The remaining messages are received from the apply tasks 207. If the scheduler task 205 receives a WAIT CHUNK message from an apply task 207, then the apply task 207 is ready to receive another chunk, and the scheduler task 205 looks in the logical change records received from the fetch task 203 for a chunk belonging to a transaction assigned to the apply task 207 and send the chunk to the apply task 207.

If the scheduler task 205 receives a WAIT DEP message from an apply task 207, then the apply task 207 is waiting for a dependency to be satisfied before the apply task 207 can commit its transaction. In this case, the scheduler task 205 checks the dependency list for the transaction and, if all dependencies are satisfied, lets the apply task 207 continue; otherwise the apply task 207 is put on the dependency queue 213 (step 511).

When the scheduler task 205 receives a WAIT COMMIT message from an apply task 207, the scheduler task 205 checks to see if a synchronization point is in effect and whether the communication system change number for the transaction that the apply task 207 is working on is greater than the high watermark (HWM). If so, the apply task 207 is put on the synchronization queue 215 (step 513), where the apply task 207 waits until the low watermark (LWM) catches up to the high watermark (HWM).

Receipt of a DONE JOB by the scheduler task 205 means that the apply task 207 have committed its transactions. Accordingly, the K-safety invariants are maintained, e.g. by incrementing #idle, the number of idle apply tasks 207; decrementing #safe, the number of safe apply tasks 207; and incrementing #reserve, the number of reserved apply tasks 207, if #reserve+#safe<K (step 515). Then, the scheduler task 205 checks to see if committing this transaction satisfies any dependency for which other apply tasks 207 were waiting in dependency queue 213 (step 517). Also, the high watermark HWM is updated, and if the high watermark has increased, the apply tasks 207 in the synchronization queue 215 for transactions having commit system change numbers below the new high watermark HWM are woken up (step 519).

Upon processing these and other messages, execution proceeds to step 521 on FIG. 5B via connector B, where the low watermark LWM is updated, and apply tasks 207 waiting on a watermark dependency are woken up if the watermark dependency is satisfied.

Steps 523 through 533 govern the assignment of jobs in the unassigned queue 211 to apply tasks 207. Specifically, the K-safety invariant is checked at step 523, determining if #idle > #reserved. If so, then an unassigned job from the unassigned queue 211 is assigned to an idle apply task 207, decrementing #idle (step 525). If the job is for a complete transaction (tested at step 527), then the job is marked safe, where #safe is incremented (step 529). On both branches from step 527, execution loops back to step 523 where another job is assigned to an idle apply task 207, if possible.

On the other hand, if at step 523, #idle <=#reserved, then only safe jobs can be assigned to idle apply tasks 207. Step 531 checked to see if there are any apply tasks 207 that are idle, and if there is an idle apply task 207, a complete job (i.e. with a commit) is schedules from the unassigned queue 211 (step 533). The job is then marked safe, where #safe is incremented (step 529), execution loops back to step 523 where another job is assigned to an idle apply task 207, if possible.

When no more jobs can be assigned to apply tasks 207, execution proceeds to step 535 where additional synchronization point processing occurs. Specifically, the scheduler task 205 checks to see whether the low watermark LWM has reached the high watermark HWM. If so, the synchronization point is set to the current system change number at the standby database 110 and the apply tasks 207 lie waiting on the synchronization queue 215 are allowed to continue (step 537). In either case, execution of the main event loop returns to step 501 in FIG. 5A via connector A.

Applying Changes

Figure 6:
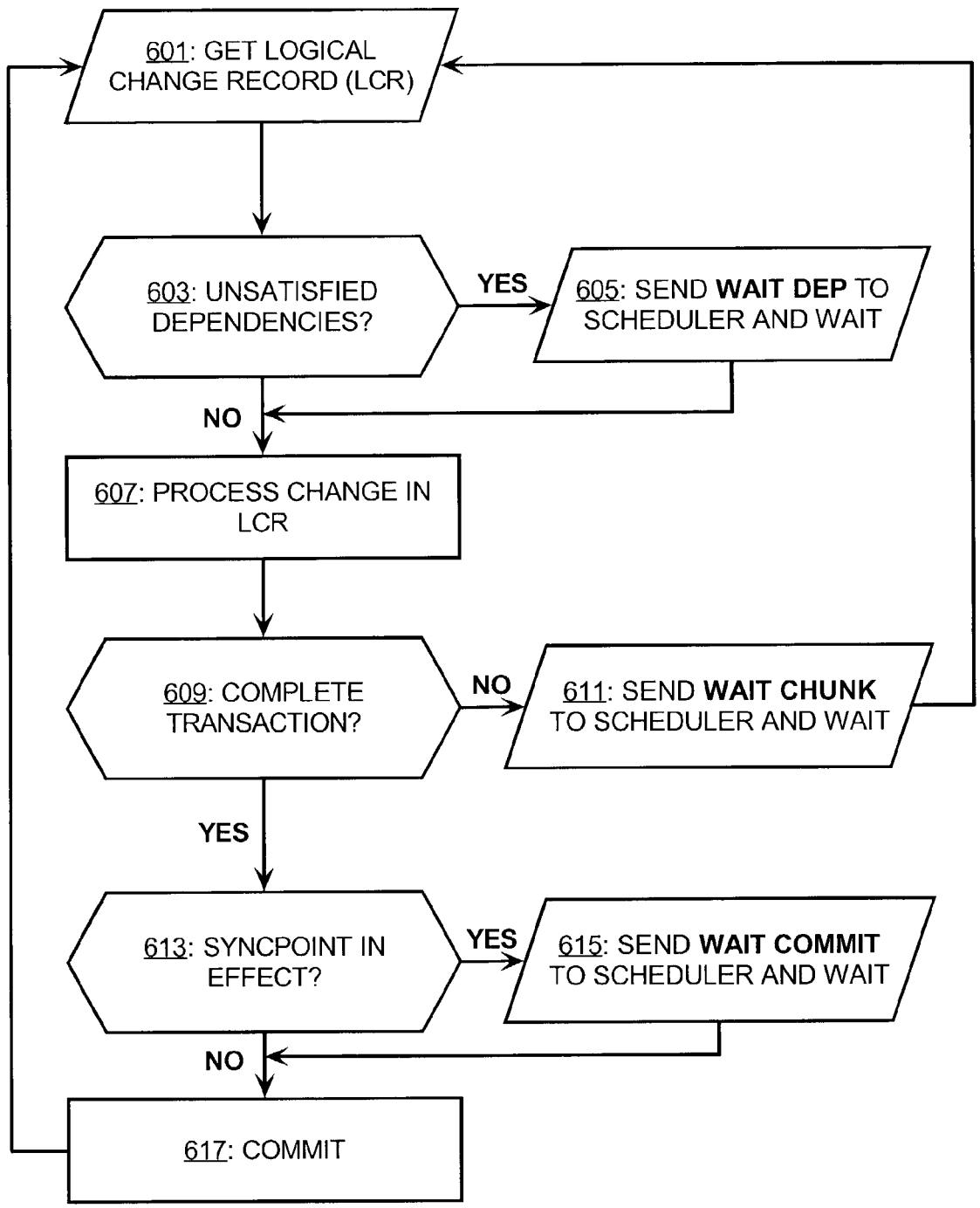
FIG. 6 is a flowchart showing the operation of an apply task in accordance with an embodiment of the present invention.

Much of the complexity of the logical snapshot process 139 lies in the operation of the scheduler task 205, which coordinates closely with each of the apply tasks 207. FIG. 6 shows the operation of an apply task 207 in accordance with an embodiment of the present invention.

Step 601 begins a loop in which a logical change record is received from the scheduler task 205. If there are any unsatisfied dependencies in the logical change record (tested at step 603), then the apply task 207 sends a WAIT DEP message to the scheduler task 205 and waits for the scheduler task 205 eventually wake it up (step 605), which happens when all the dependencies are satisfied. After wake up, execution proceeds to step 607.

The change in the logical change record is then applied but not committed yet (step 607), and the apply task 207 check to see if the logical change record is for a complete transaction (step 609). If the transaction is not complete, then there are other chunks for the apply task 207 to apply, so the apply task 207 sends a WAIT CHUNK message to the scheduler task 205 and waits (step 611). Upon waking up, execution loops back to step 601, where another logical change record will be received.

On the other hand, if the transaction is complete, then the apply task 207 determines if the scheduler task 205 is in the process of establishing a synchronization point (step 613). If such is the case, then the apply task 207 sends a WAIT COMMIT message to the scheduler task 205 to ask permission before committing the transaction (step 615). When reawoken, the apply task 207 proceeds to step 617, where the transaction is committed in the standby database 110 and the process repeats itself for another transaction.

Hardware Overview

Figure 7:
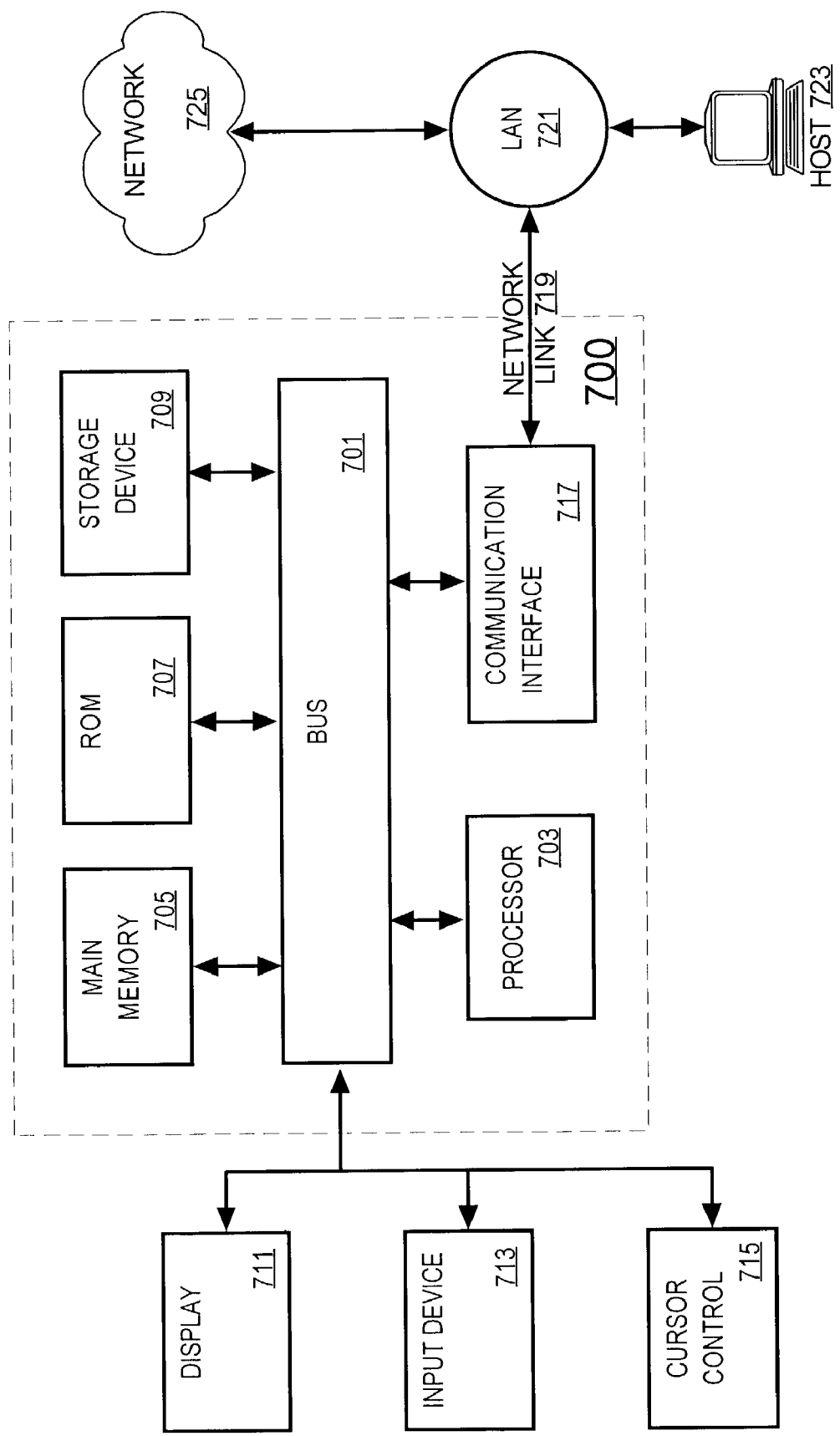
FIG. 7 depicts a computer system that can be used to implement an embodiment of the present invention.

FIG. 7 illustrates a computer system 700 upon which an embodiment according to the present invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, applying changes at a standby database is provided by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the present invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 705 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A computer-implemented method of applying changes made at a primary database system to a standby database system, comprising:
    obtaining a change record from a log containing at least some of the changes, said change record belonging to a first transaction that was committed at a first commit time in the primary database system;
    associating the change record with a second transaction that was committed at a second commit time in the primary database system that is earlier than the first commit time, wherein said associating the change record with the second transaction includes determining that the second transaction involves a change to data that the first transaction affects based on a key value of a constraint column involved in the change record; and
    scheduling a task to apply the change record at the standby database system, said task configured to commit the first transaction in the standby database system after the second transaction has been committed in the standby database system.

2. A method as according to claim 1, further comprising:
    committing a third transaction at the standby database system after the first transaction was committed at the standby database system,
    wherein the third transaction was committed at a third commit time in the primary database system that is earlier than the first commit time.

3. A method as according to claim 1, wherein a constraint column includes an identification column, a column having a uniqueness constraint, and a column having a foreign key constraint.

4. A method as according to claim 1, further comprising:
    storing an entry identifying the second transaction and the second commit time in a hash table based on a key value of a constraint column involved in a change record belonging to the second transaction;
    wherein said determining includes looking up the entry in the hash table based on the key value of the constraint column involved in the change record.

5. A method as according to claim 1, wherein said associating the change record with the second transaction includes:
    determining that the second transaction involves change to a structure or instance of a database object.

6. A method as according to claim 1, wherein said associating the change record with the second transaction includes:
    determining that the second transaction involves a commit of a transaction that has change records that were applied by the task before a commit of the transaction was extracted from the log.

7. A computer-readable medium bearing instructions arranged to cause, upon execution, one or more processors to perform the method according to claim 1.

8. A computer-implemented method of applying changes made at a primary database system to a standby database system, comprising:
    extracting change records from a log containing at least some of the changes;
    associating at least some of the change records with respective transactions that were committed at earlier commit times in the primary database system than when the changes records were committed in the primary database system; and
    scheduling a plurality of tasks to apply the change records at the standby database system, said tasks configured to wait for committing the change records in the standby database system until after the associated transactions have been committed in the standby system,
    wherein at least two transactions have been committed in the standby database system in a different order than the order in which the at least two transactions have been committed in the primary database system.

9. A method as according to claim 8, further comprising:
    establishing a synchronization point based on an upper bound of commit times in the primary database system of transactions that have been committed in the standby database system;

causing the tasks to delay committing the change records in the standby database system if commit times in the primary database system of the corresponding change records are greater than the synchronization point;

determining when a lower bound of commit times in the primary database system of transactions that have been committed in the standby database system reaches the synchronization point; and in response to said determining, causing the tasks to resume committing the change records in the standby database system.

10. A method as according to claim 8, further comprising:

reserving at least one of the tasks for applying change records a safe transaction, wherein a safe transaction either depends on no other transaction or only on another transaction that is safe.

11. A computer-readable medium bearing instructions arranged to cause, upon execution, one or more processors to perform the method according to claim 8.

12. A computer-implemented method of applying changes made at a primary database system to a standby database system, comprising:

extracting change records from a log containing at least some of the changes;

establishing a synchronization point based on an upper bound of commit times in the primary database system of transactions that have been committed in the standby database system;

scheduling a plurality of tasks to apply the change records at the standby database system, said tasks configured to delay committing the change records in the standby database system if commit times in the primary database system of the corresponding change records are greater than the synchronization point;

determining when a lower bound of commit times in the primary database system of transactions that have been committed in the standby database system reaches the synchronization point; and in response to said determining, causing the tasks to resume committing the change records in the standby database system.

13. A computer-readable medium bearing instructions arranged to cause, upon execution, one or more processors to perform the method according to claim 12.

\* \* \* \* \*